(12) United States Patent
Mikla et al.

(10) Patent No.: US 6,720,019 B2
(45) Date of Patent: Apr. 13, 2004

(54) METHOD OF INTENSIFYING THE PULPY OR GRITTY TEXTURE OF FOODSTUFFS

(75) Inventors: Ondrej Mikla, Langenlebarn (AT); Dietmar Grüll, Langenschönbichl (AT)

(73) Assignee: Suedzucker AG, Mannheim/Ochsenfurt (DE)

( * ) Notice: Subject to any disclaimer, the term of this patent is extended or adjusted under 35 U.S.C. 154(b) by 293 days.

(21) Appl. No.: 09/873,100

(22) Filed: Jun. 1, 2001

(65) Prior Publication Data

US 2002/0012735 A1 Jan. 31, 2002

Related U.S. Application Data

(63) Continuation of application No. PCT/AT99/00288, filed on Nov. 25, 1999.

(30) Foreign Application Priority Data

Dec. 1, 1998 (AT) .............................................. 98/2027

(51) Int. Cl.$^7$ ...................... A23L 1/0522; A23L 1/217; A23L 1/24
(52) U.S. Cl. ...................... 426/589; 426/599; 426/637; 426/638; 426/661
(58) Field of Search ................................. 426/589, 599, 426/637, 638, 661

(56) References Cited

U.S. PATENT DOCUMENTS

| 5,824,798 A | * | 10/1998 | Tallberg et al. | ............. 536/128 |
| 6,541,060 B2 | * | 4/2003 | Jeffcoat et al. | ............. 426/578 |
| 2003/0087006 A1 | * | 5/2003 | Buwalda et al. | ............. 426/589 |

FOREIGN PATENT DOCUMENTS

GB  2 347 840  *  9/2003

* cited by examiner

*Primary Examiner*—N. Bhat
(74) *Attorney, Agent, or Firm*—Laurence A. Greenberg; Werner H. Stemer; Ralph E. Locher

(57) ABSTRACT

A method of intensifying the pulpy or gritty texture of pulpy or gritty liquid to pasty foodstuffs by adding amylopectin potato starch, i.e. potato starch having an amylopectin content of at least 95%, preferably at least 98%. In this manner, an organoleptic improvement is achieved as compared to conventional potato starch as well as compared to waxy maize starch.

35 Claims, 1 Drawing Sheet

Diagram 1  Sensory Profile of Test Products – Tomato Ketchup

Diagram 1  Sensory Profile of Test Products – Tomato Ketchup
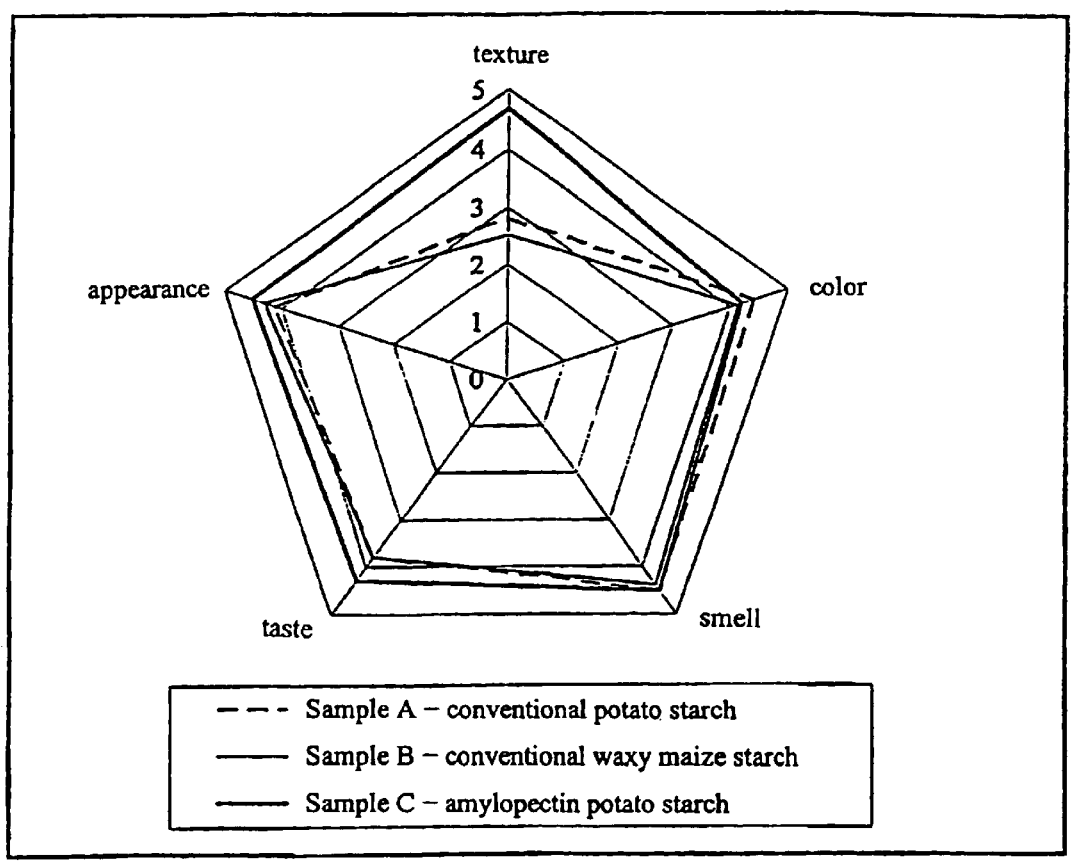

METHOD OF INTENSIFYING THE PULPY OR GRITTY TEXTURE OF FOODSTUFFS

CROSS-REFERENCE TO RELATED APPLICATION

This application is a continuation of copending International Application No. PCT/AT99/00288, filed Nov. 25, 1999, which designated the United States.

BACKGROUND OF THE INVENTION

Field of the Invention

The present invention relates to a method of intensifying the pulpy or gritty texture of pulpy or gritty liquid to pasty foodstuffs.

For a foodstuff, the organoleptic characteristics "pulpy" or "gritty" are a sensory characterization of the texture which is characterized by the presence of coarse structured particles. Pulpy and gritty textures are in contrast to textures that may be called creamy or smooth. By texture, a group of physical and sensory properties associated with the structure of the product is understood. Texture may be sensed by the tactile sense, commonly in the mouth, and in some instances may even be measured objectively as a function of mass, distance and time. Among the physical properties of importance for the present method are rheological characteristics, such as viscosity, elasticity and yield point.

Reference is had, in this context, to Römpp's Chemie Lexikon, 9th Edition, which defines "Pulpe" ("pulp"), a mashy mass which still contains coarser particles.

According to ISO Standard 11036, "Sensory analysis—Methodology—Texture profile", pulpiness and grittiness are geometrical attributes and are characterized under the collective term "granularity" as those geometrical texture properties which are defined in relation to the sensation of size and shape of particles and which are defined as gritty and pulpy, respectively. According to this standard, by texture all mechanical, geometrical and surface properties of a product are to be understood which are perceived by mechanical, tactile and, possibly, visual and auditory receptors. For the sensory texture analysis, generally recognized methods of foodstuff analysis have become common and laid down in extensive publications (e.g. Fliedner & Wilhelmi: "Grundlagen und Prüfverfahren der Nahrungsmittelsensorik", 1989, Behr's Verlag, Hamburg; Amerine et al.: "Principles of Sensory Evaluation of Food", 1965, Academic Press, New York; Moskowitz, "Food Texture", 1987, Marcel Deker, Inc., New York). In addition to these publications and the afore-mentioned ISO Standard 11036, also ISO Standard 11035 "Sensory analysis—Identification and selection of descriptors for establishing a sensory profile by a multidimensional approach" ought to be mentioned, according to which the performance of sensory panel tests and the properties and the choice of the panelists or examiners, respectively, necessary therefor are comprehensively determined.

According to the general principles of sensorics, depending on the aim set, two types of examiner groups for texture evaluation are under consideration. If the consumers' reaction to the texture of the product is to be examined, large groups of consumers are resorted to. If, however, a more sophisticated texture characterization for establishing the texture-forming parameters is sought, an analytically oriented evaluation of the texture is carried out by a small, especially trained group of examiners.

Instrumental texture analysis comprises determining those rheological properties which are related to the sensed texture. The instrumental methods for determining the texture properties of complex food systems may be divided into the following groups:

quantitative methods for determining rheologically exactly defined parameters, qualitative methods using devices which subject the foodstuffs to a mechanical action (shearing, deformation)

Although the measured values do not allow for a direct derivation of rheologically exactly defined parameters, experience has shown that the rheological properties are well reflected and that they correlate well with sensed texture characteristics.

Besides proteins, lipids and diverse saccharides, starch is one of the most important texturogens of a foodstuff. Among the most frequent texture-forming tasks of a starch in complex food systems are: the binding of a required amount of water and its controlled release and/or its retention, the modification of the rheological properties by forming a three-dimensional network in harmony and often in synergy with other texture formers present as well as its stabilization, which may lead to a structure that may vary from a soft to a solid, gel-type structure. The texture may often decisively contribute to enhancing the taste of a foodstuff.

The use of diverse starches and their derivatives in the commercial and industrial production of foodstuffs has long been common production practice. By using native and/or modified starch, the sensory and physical properties of the food products are decisively influenced, whereby the desired enjoyment level of the products can be adjusted. As a rule, the common starches and starch derivatives promote the formation of creamy or smooth textures.

The raw material starch is recovered from plant products, such as cereal and potatoes, and in subtropical regions also other plant products are industrially utilized for the recovery of starch. From the chemical point of view, starch is a mixture of two structurally different polyglucans, i.e. amylose and amylopectin, both of which consist of several thousand linked glucose molecules. Amylose is characterized by a nearly unbranched linear structure of linked glucose units. In amylopectin, numerous shorter molecules of an amylose-like structure are bound into a larger, branched structure.

The common, natural starches contain from 15% to 30% of amylose, depending on the type of plant from which they have been recovered. Special plant genotypes obtained by crossbreeding or by targeted genetic manipulation may also contain other portions of the two starch molecules. So-called high amylose starches having an amylose content of up to 70% are known. Moreover, also so-called amylopectin starches are known which contain up to 98% of amylopectin. Such an amylopectin starch is waxy maize starch recovered from a maize genotype in which the produced starch is nearly free of amylose. The term "waxy" comes from the fact that the maize grain has a waxy appearance.

In countries in which maize is the prevailing source of starch, it is known to use waxy maize starch instead of normal maize starch for starch-containing foodstuffs of high quality. The organoleptic sensation caused thereby is termed less sticky, less gummy and thus more pleasant.

Examples of methods and possibilities of changing the physical and organoleptic properties of foodstuffs mentioned in the literature are the following:

International PCT publication WO 93/22938, Unilever: This publication describes starch-thickened foodstuffs with an enhanced freezing-thawing stability and "good" texture, a good texture here meaning "smooth". The starch component is a mixture of native starch and sheared amylopectin starch, i.e. an amylopectin starch which is mechanically degraded and thus cannot cause any pulpiness.

Swedish publication SE 9502 629 Sveriges Staerkelseproducenter: According to this publication, amylopectin potato starch is used as a substitute for gum arabic in the production of confectionery. The aim is to produce stable, clear solutions, and therefore the method steps of a starch degradation, hydrolysis and dextrination have to be effected. This clearly points to the fact that also here the molecular structure must be largely degraded, and thus a pulpy and gritty texture is no longer possible.

International PCT publication WO 97/03573 Sveriges Staerkelseproducenter: When filling liquid foodstuffs or liquid foodstuffs that contain pieces into cans, there is a risk of the liquid spilling over from the still open cans during manipulation and transportation thereof, unless it has a sufficient viscosity. To increase the viscosity, the most varying starch products have already been added previously. Yet, in most instances, after temperature sterilization, excessive viscosities, or an undesired turbidity of the foodstuff, respectively, have been found in the finished foodstuff. On the other hand, an amylopectin potato starch from potatoes genetically inhibited with respect to the amylose formation has proven particularly suitable for this purpose, because by adding this amylopectin potato starch, a high initial viscosity of the liquid contained in the cans is attained, on the one hand, yet this viscosity is lost again by the temperatures of the preservation procedure, and the finished foodstuff, moreover, remaining clear and not becoming unsightly by being turbid. This means that the temperature effect during the preservation procedure of the foodstuffs in the cans must be high enough and long enough to achieve a thermal degradation of the amylopectin potato starch. EP 0 799 837 Avebe: Amyl pectin potato starch in molecularly dispersed form in combination with emulsifiers in aqueous compositions leads to the formation of complexes (interaction products) which cause a desired gel structure or viscosity of the compositions, respectively.

Mention of the molecularly dispersed form of the amylopectin potato starch shows that also in this instance a smooth texture is desired which, according to the present invention, is to be explicitly avoided.

European patent application EP 0 769 501 Unilever: Here a shearing method for amylopectin starch is disclosed, by which the foodstuffs are to obtain a smooth texture and a good freezing-thawing stability, as they are mentioned in the afore-mentioned WO 93/22938. It is explicitly stated that the granular structure of the starch is to be destroyed and the amylopectin is to be solubilized.

SUMMARY OF THE INVENTION

It is accordingly an object of this invention to provide a method of intensifying the pulpy or gritty texture of foodstuffs that overcomes the above-mentioned disadvantages of the prior art methods and enables pulpy or gritty foodstuffs to be produced economically with reduced concentrations of ingredients responsible for imparting a pulpy or gritty texture.

It is also an object of this invention to provide certain foodstuffs having intensified pulpy or gritty that overcome the above-mentioned disadvantages of the prior art methods and can be produced economically with reduced concentrations of ingredients responsible for imparting a pulpy or gritty texture.

With the foregoing and other objects in view there is provided, in accordance with the invention, a method in which amylopectin potato starch is added to a foodstuff in an effective amount to cause the desired organoleptic change of the treated foodstuff.

The object of the present invention, an increase in the pulpiness and grittiness of a foodstuff, so far has neither been mentioned nor obtained.

According to the invention, the aforementioned object is achieved in that amylopectin potato starch, i.e. potato starch having an amylopectin content of at least 95%, preferably at least 98%, is added to the foodstuff in an amount causing the desired organoleptic change of the treated foodstuff, in particular in cold-swelling form, optionally in mixture with other, common starch products.

It is really surprising that an already existing pulpy texture is clearly intensified by the addition of amylopectin potato starch or that by the said addition it becomes possible to reduce the portion of the pulpiness-causing component of the foodstuff with the pulpiness remaining constant. In other words, this means that in each case the pulpiness of the foodstuff is intensified, i.e. either with the customary content of the pulpiness-causing component beyond the normal extent, or with a lower than customary content of the pulpiness-causing component up to the common extent.

In addition to the said effect of being able to use less of the pulpiness-causing—and thus mostly expensive—component for this foodstuff when producing a pulpy foodstuff, it is also pointed out that this effect is not only obtained by replacing the pulpiness-causing component by an equal amount of amylopectin potato starch, but that a portion of amylopectin potato starch of far less weight is required to replace a higher-weight portion of the pulpiness-causing substance while attaining the same organoleptic effect. In other words, this means that the foodstuff can contain a smaller amount of dry substance while maintaining the same effect of taste, which is significant not only from the economic point of view, but also from the nutritional viewpoint.

It goes without saying that with the method according to the invention, a treatment of the foodstuff in a manner that the supra-molecular structure of the starch gets lost and a molecular dispersed state is obtained is to be expressly avoided. A person skilled in the art knows that every starch can be degraded by the most varying procedures, such as heating, shearing etc., and that the duration of these procedures has a great influence on the resultant molecule structure. For instance, a rapid and short heating to higher temperatures can have the same effect as a long-lasting heating at lower temperatures. The same applies to shearing at different temperatures and at different intensities and treatment times, etc.

In theory, amylopectin potato starch may be prepared from normal potato starch by chemically separating the amylose, yet this method is very complex and expensive. Ever since it has become possible to prevent amylose formation in the potato itself by genetically modifying the potato, a new type of starch has been available which consists nearly exclusively of amylopectin, without using any chemical processes. Thus, with the method according to the invention, an amylopectin potato starch preferably derived from a potato modified by breeding, mutation, or molecular-biological or genetic engineering methods so as to suppress the amylose content, is added to the foodstuff.

It has been shown that this starch which preferably has been recovered from transgenic potatoes, and its physically modified and/or chemically derivatized forms, are particularly well suited to intensify the said pulpiness or grittiness, and that its effect compared to common starches, in particular also compared to the known waxy maize starch is clearly better. This effect, which could not be foreseen, is proven by the results of the sensory and physical tests explained in more detail below.

Without wishing to be bound by any theory, it is assumed that the phenomenon of increasing the pulpiness and grittiness of the texture can be explained, on the one hand, by the increased stability of the starch grains of the amylopectin potato starch as compared to amylose starch grains as discussed in EP-0816299, and, on the other hand, by the larger size of the grains of the potato starch as compared to starch grains of other raw material sources. Beside the sensory effects, the starch products of amylopectin potato starch positively affect the viscosity and the stability of the foodstuff, with the comparatively high viscosity of the starch glue of the native starch being just as important as that of the derivatives. Also the diminished turbidity of the starch glue is to be mentioned as a positive factor in this connection. The desired enjoyment value of the foodstuffs is increased by the starch products mentioned or, indeed, first obtained thereby.

For the purpose of this invention, physically modified amylopectin potato starch is understood to mean modified amylopectin potato starch which has been modified by controlled temperature and/or pressure treatment or by mechanical action, and preferably has been made cold-soluble. In most instances, such modified starches have been modified in their supra-molecular structure. Chemically derivatized amylopectin potato starch comprises amylopectin potato starch modified by esterification, etherification and/or cross-linking of the molecules. The chemical changes in most instances cause a stabilization of the starch grain. Often a plurality of physical methods, a plurality of chemical methods, or both physical and also chemical methods are jointly used to modify the amylopectin potato starch. Preferably, the amylopectin potato starch is used in cold-swelling form.

Among the wide variety of foodstuffs, mainly the following product groups can be considered for use of amylopectin-rich potato starch as a generator of a pulpy texture:
soups, sauces, dressings and dips;
tomato ketchup;
mashed potatoes;
fruit and vegetable containing beverages and paps;
fruit, nut, poppy seed and cottage cheese-containing fillings; semolina puddings and desserts;
as well as the premixes or dehydrated forms of all of these foodstuffs.

Just as with all customary starch products in the customary commercial and industrial production methods, the practical application of the starch products according to the invention can be in agreement with the GMP (good manufacturing practice). The starch products mentioned, which often are used in roll-dried or extruded condition, preferably have particle sizes of between 0.250 mm and 2.00 mm, in particular between 0.500 mm and 1.500 mm. To adjust the desired texture, the starch products mentioned can be advantageously admixed to other common starch products in an amount of from 5% to 90%.

By using amylopectin potato starch according to the invention, the amounts of food components used that otherwise are responsible for the pulpy structure can be reduced by 15% to 30% without adverse effects on the texture. This is an important economic advantage. In the case of tomato ketchup, this is, e.g., a reduction in the content of tomato pulp. With mashed potatoes, the portion of potato powder can be reduced by adding amylopectin potato starch, which can also have economic advantages in addition to improving the taste.

Surprisingly, it has been shown in the course of Applicant's research in this field that the addition of an emulsifier to a pulpy foodstuff very often makes the pulpiness disappear, and therefore has precisely the opposite effect than what is desired.

Although the invention is illustrated and described herein as embodied in a method of intensifying the pulpy-or gritty texture of pulpy or gritty liquid to paste-like foodstuffs, as well as certain foodstuffs having intensified pulpy-or gritty texture, it is nevertheless not intended to be limited to the details shown, since various modifications and structural changes can be made therein without departing from the spirit of the invention and within the scope and range of equivalents of the claims.

The practice and method of operation of the invention, however, together with additional objects and advantages thereof will be best understood from the following description of specific embodiments when read in connection with the accompanying drawing and example.

BRIEF DESCRIPTION OF THE DRAWING

The sole FIGURE of the drawing is a diagrammatic presentation of the results of a sensory evaluation of a product according to the invention and conventional products by a panel of trained panelists using the ISO standard 11035 "Sensory analysis—Identification and selection of descriptors for establishing a sensory profile by multidimensional approach."

DESCRIPTION OF PREFERRED EMBODIMENTS

The following example and the results of the physical and sensory tests show the advantageous effects of the addition of an esterified and cross-linked amylopectin potato starch according to the invention.

EXAMPLE

Test Products

Tomato ketchup was prepared according to the invention by admixing acetylated and adipate-cross-linked amylopectin potato starch with the food ingredients shown below. The components were mixed to a homogenous mixture, heated under continuous stirring at 90° C. and maintained at this temperature for 30 min. After cooling to 50° C., the test products were filled into closeable containers. For comparison, acetylated and adipate-cross-linked starch derivatives which had been prepared in the same manner from conventional starches were used. The recipes and the results of the physical measurements and of the sensory tests for pulpiness are summarized in the following Table 1.

TABLE 1

| Basic Starch Component | Product A Conventional Potato Starch % by weight | Product B Conventional waxy maize starch % by weight | Product C Amylopectin potato starch % by weight |
|---|---|---|---|
| Tomato pulp, 3-fold concentrated | 33.00 | 33.00 | 28.00 |
| Glucose syrup 40 DE, 80 Bx | 4.00 | 4.00 | 4.00 |
| Modified starch | 2.00 | 2.00 | 3.00 |
| Crystal sugar | 16.20 | 16.20 | 16.20 |
| Vinegar (5%) | 15.00 | 15.00 | 15.00 |
| Common salt | 3.00 | 3.00 | 3.00 |

TABLE 1-continued

| Basic Starch Component | Product A Conventional Potato Starch % by weight | Product B Conventional waxy maize starch % by weight | Product C Amylopectin potato starch % by weight |
| --- | --- | --- | --- |
| Ka sorbate | 0.20 | 0.20 | 0.20 |
| Spices | 0.20 | 0.20 | 0.20 |
| Water | to 100.00 | to 100.00 | to 100.00 |
| Yield point | 30.2 Pa | 34.0 Pa | 25.1 Pa |
| Viscosity | 6800 mPA · s | 7200 mPa · s | 7000 mPa · s |

The test products where Theologically examined as follows:

Yield point

The yield point was determined by means of a Bohlin CS 50 shearing strain-controlled rheometer equipped with a 40/40 mm cone/plate measuring system, in a dynamic rotation measurement at 25° C. From the point of measurement technology, a shearing strain range is given for this test and is linearly passed in a defined time. If the shearing stresses are sufficiently small, an elastic deformation will appear also below the yield point which gradually merges into flow. If within this "transition range", the instantaneous viscosity is calculated, the maximum of this curve is a helpful indication of the onset of flow. The shearing stress at this site will be determined completely automatically and indicated as the yield point (Bohlininfo,7/95).

Viscosity

The viscosity of the test products was determined by means of a Brookfield RVT viscosimeter with spindle 7 at 50 rpm and 50° C.

The yield point which inversely correlates with the pulpiness was much lower with product C than with the other products, whereas the viscosity of all three products was in quite a comparable range.

Sensory analysis (cf. FIG. 1)

The sensory analysis was carried out by a panel test with trained panelists by means of the ISO standard 11035 "Sensory analysis—Identification and selection of descriptors for establishing a sensory profile by multidimensional approach", wherein the test products were rated according to a scale comprising 5 points. 1 point meant a creamy, smooth texture, 5 points meant a pulpy texture. Besides the texture, also further features, such as smell, taste, appearance and color, were included in the sensory examination to allow for the establishment of a so-called sensory profile of the test products, as can be seen from FIG. 1. From this diagram it appears that from the sum of these parameters, a graphical representation can be obtained in which the area obtained is a measure of the quality of the product. The difference between conventional potato starch and waxy maize starch is relatively slight. Surprisingly, however, the area obtained for the amylopectin potato starch has a qualitatively clearly better evaluation over the 5 parameters than for the two other starches. What is striking is that the sensory-determined pulpiness of product C which according to the invention, had been prepared with the addition of amylopectin potato starch, was decisively higher than those of products A and B, which had been prepared using conventional potato starch or waxy maize starch. The texture was rated with the highest value of the three starches examined. Among the other parameters, the taste of product C which is associated with the texture, had a better rating than products A and B, whereas the parameters appearance, color and smell yielded substantially the same results as products A and B.

We claim:

1. A method of intensifying a pulpy or gritty texture of pulpy or gritty liquid to paste-like foodstuffs, comprising:
   providing a foodstuff; and
   adding amylopectin potato starch having an amylopectin content of at least 95% to said foodstuff in an amount sufficient to cause an organoleptic change of said foodstuff.

2. The method according to claim 1, wherein said amylopectin potato starch is a potato starch having an amylopectin content of at least 98%.

3. The method according to claim 1, wherein said amylopectin potato starch is added to said foodstuff in a mixture with another starch product.

4. The method according to claim 1, wherein said amylopectin potato starch is derived from a potato having been modified so as to suppress an amylose content of said potato.

5. The method according to claim 4, wherein the amylose content of said potato has been suppressed by a process selected from the group consisting of breeding, mutation, a molecular-biological process and genetic engineering.

6. The method according to claim 1, wherein said amylopectin potato starch is a native amylopectin potato starch.

7. The method according to claim 1, wherein said amylopectin potato starch is a cold-swelling amylopectin potato starch.

8. The method according to claim 1, wherein said amylopectin potato starch is a physically modified amylopectin potato starch.

9. The method according to claim 1, wherein said amylopectin potato starch is at least one chemically derivatized amylopectin potato starch.

10. The method according to claim 9, wherein said chemically derivatized amylopectin potato starch is selected from the group consisting of etherified, esterified and cross-liked amylopectin potato starch.

11. The method according to claim 10, wherein said chemically derivatized amylopectin potato starch is selected from the group consisting of acetylated and adipate-cross-linked amylopectin potato starch.

12. The method according to claim 10, which comprises adding a mixture of at least two of said amylopectin potato starches to said foodstuff.

13. The method according to claim 1, wherein said amylopectin potato starch has a grain size of from 0.25 mm to 2.00 mm.

14. The method according to claim 13, wherein said amylopectin potato starch has a grain size of from 0.500 mm to 1.500 mm.

15. The method according to claim 1, wherein products otherwise commonly responsible for said pulpy or gritty texture of said foodstuff are used in an amount reduced by from 15% to 30%.

16. The method according to claim 1, wherein said foodstuffs are selected from the group consisting of soups, sauces, dressings, dips and premixes and dehydrated forms of these foodstuffs.

17. The method according to claim 1, wherein said foodstuffs are selected from the group consisting of fruit and vegetable-containing beverages and paps and premixes and dehydrated forms of said foodstuffs.

18. The method according to claim 1, wherein said foodstuff is selected from the group consisting of fruit, nut, poppy seed and cottage cheese containing fillings, and premixes and dehydrated forms thereof.

19. The method according to claim 1, wherein said foodstuff is selected from the group consisting of semolina pudding and desserts and premixes and dehydrated forms thereof.

20. The method according to claim 1, wherein said foodstuff is tomato ketchup.

21. The method according to claim 20, wherein from 15% to 30% less tomato pulp is added to a starting mass of said tomato ketchup as compared to conventional tomato ketchup.

22. The method according to claim 1, wherein said foodstuff is selected from the group consisting of mashed potatoes and premixes and dehydrated forms thereof.

23. The method according to claim 22, wherein from 15% to 30% less potato powder is added to a starting mass of said mashed potatoes as compared to conventional mashed potatoes.

24. A tomato ketchup comprising an amylopectin potato starch having an amylopectin content of at least 95%.

25. The tomato ketchup of claim 24, wherein said amylopectin potato starch has an amylopectin content of at least 98%.

26. The tomato ketchup of claim 24, wherein said amylopectin potato starch is selected from the group consisting of native amylopectin potato starch, physically modified amylopectin potato starch and chemically derivatized amylopectin potato starch.

27. The tomato ketchup of claim 24, wherein said amylopectin potato starch is selected from the group consisting of etherified amylopectin potato starch, esterified amylopectin potato starch and cross-linked amylopectin potato starch.

28. The tomato ketchup of claim 24, wherein said amylopectin potato starch is a cold-swelling amylopectin potato starch.

29. The tomato ketchup of claim 24, comprising acetylated and adipate-cross-linked amylopectin potato starch and from 15% to 30% less tomato pulp as compared to conventional tomato ketchup.

30. Mashed potatoes or a dehydrated pre-product thereof, comprising an amylopectin potato starch having an amylopectin content of at least 95%.

31. The mashed potatoes or dehydrated pre-product thereof of claim 30, wherein said amylopectin potato starch has an amylopectin content of at least 98%.

32. The mashed potatoes or dehydrated pre-product thereof of claim 30, wherein said amylopectin potato starch is selected from the group consisting of native amylopectin potato starch, physically modified amylopectin potato starch and chemically derivatized amylopectin potato starch.

33. The mashed potatoes or dehydrated pre-product thereof of claim 30, wherein said amylopectin potato starch is selected from the group consisting of etherified amylopectin potato starch, esterified amylopectin potato starch and cross-linked amylopectin potato to starch.

34. The mashed potatoes or dehydrated pre-product thereof as set forth in claim 30, wherein said amylopectin potato starch is it cold-swelling amylopectin potato starch.

35. The mashed potatoes or dehydrated pre-product thereof of claim 30, comprising acetylated and adipate-cross-linked amylopectin potato starch and from 15% to 30% less potato powder as compared to conventional mashed potatoes.

* * * * *

UNITED STATES PATENT AND TRADEMARK OFFICE
CERTIFICATE OF CORRECTION

PATENT NO.     : 6,720,019 B2
DATED          : April 13, 2004
INVENTOR(S)    : Ondrej Mikla et al.

It is certified that error appears in the above-identified patent and that said Letters Patent is hereby corrected as shown below:

<u>Title page,</u>
Item [73], Assignee, should read as follows:
-- Südzucker Aktiengesellschaft Mannheim/Ochsenfurt, Mannheim (DE) --

Signed and Sealed this

Twelfth Day of April, 2005

JON W. DUDAS
*Director of the United States Patent and Trademark Office*